J. G. MEYER.
VACUUM DUST REMOVER.
APPLICATION FILED DEC. 31, 1908.
956,862.
Patented May 3, 1910.
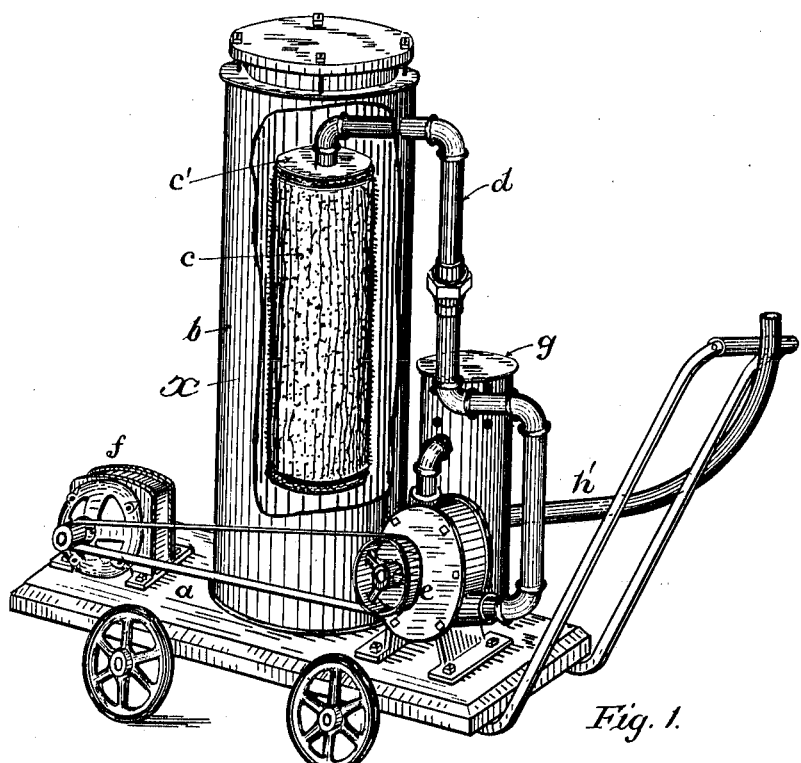
Fig. 1.
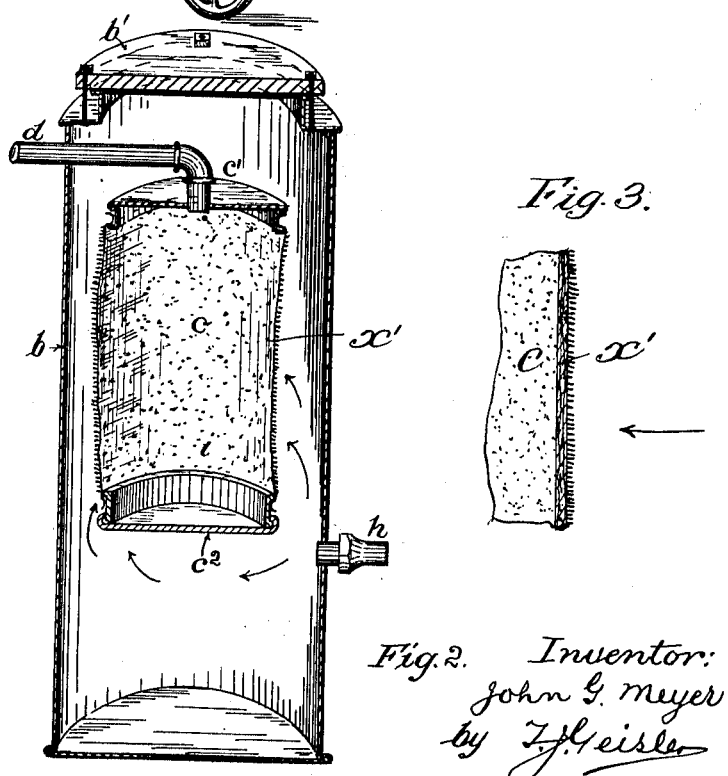
Fig. 2.
Fig. 3.
Witnesses:
Inventor:
John G. Meyer

UNITED STATES PATENT OFFICE.

JOHN G. MEYER, OF PORTLAND, OREGON.

VACUUM DUST-REMOVER.

956,862.  Specification of Letters Patent.  Patented May 3, 1910.

Application filed December 31, 1908. Serial No. 470,262.

*To all whom it may concern:*

Be it known that I, JOHN G. MEYER, a citizen of the United States, and a resident of Portland, in the county of Multnomah and State of Oregon, have invented a certain new and useful Improvement in Vacuum Dust-Removers, of which the following is a specification, reference being had to the accompanying drawings as constituting a part thereof.

This invention relates to machines of the class generally designated vacuum carpet cleaning machines, having for their purpose the removing of dust from carpets, and other articles, by the process of air suction through the article being cleaned; and my invention has for its object to provide the receptacle, or receiver, into which the dust is drawn by suction, with a filter which will operate like a sieve to retain the dust in the receiver, and possess, furthermore, the property of keeping the porous surfaces of the sieve or filter continuously open, for the passage of air drawn through the receiver by the suction mechanism.

I attain my object by providing, within the receiver, a filter comprising a hollow or drum-like body, made of porous material and having a fleecy surface, such as canton flannel, for example, and I turn the fleecy surface out. The fleecy surface serves to intercept the particles of dust; the minute fibers of the fleece holding the particles of dust away from closer contact with the porous body of the filter, and thus maintaining a clear passage for the air drawn through the body of the filter. The dust particles will cling to the exterior fleecy surface of the filter-body until the gravity of the collected clusters of dust causes the same to drop to the bottom of the receiver; for the entire interior of the receiver is placed in a state of vacuum by the air suction device, and in consequence the clustering dust is readily precipitated.

The details of my invention are illustrated in the accompanying drawings, in which:

Figure 1 is a perspective view of a portable vacuum dust remover, or carpet cleaner machine, embodying my invention, which is disclosed in the broken-away receiver; and Fig. 2 is a vertical section of the receiver and the filter therein contained. Fig. 3 is an enlarged detail view of a piece of the fabric from which the body of the dust filter is constructed, the fibers being separated to better illustrate them.

The letters designate the parts described.

$a$ represents a truck, on which is mounted a dust-receiver, $b$, within which is contained my filter, $c$, which is suspended by its upper end from the pipe, $d$, extending from the head $c'$ of the filter, through the wall of the receiver, $b$, to the rotary air-pump $e$; the latter being driven by a motor $f$, and operating connections. $g$ is a muffler into which the air, sucked through the receiver, is, in the first instance, discharged, so as to avoid the annoyance of spraying lubricant with such discharge; since the discharged air would be more or less laden with lubricant taken from the operating parts.

A more comprehensive detail of the arrangement of the receiver and filter, above referred to, is shown in the enlarged sectional view of the parts in Fig. 2. The receiver, $b$, is made with a removable head $b'$. Near the base of the receiver is provided an inlet nipple $h$, to which is connected the hose $h'$, which has the usual suction mouthpiece. The suction pipe, $d$, enters through the wall of the receiver, near the top. The inner end of said pipe, $d$, extending through the top end-piece $c'$ of the filter $c$, and serving as a support for the latter. The body of the filter, $c$, is made of some porous material, which possesses the property of excluding dust, and at the same time prevents clogging of the pores, so as not to interfere with the free passage of air sucked through the receiver by the rotary air-pump $e$.

In my experiments, I have discovered that canton flannel is admirably adapted for the service required. The fleecy surface of canton flannel being turned out, and besides providing a fine sieve, the minute fibers thereof $x'$ serve to hold the particles of dust away from closer contact with the porous body of the filter, and by so doing insuring a free passage for the air drawn through the body of the filter.

The body of the filter is a sack-like structure, open at both ends, which ends are removably fastened to the top and bottom end-pieces $c'$, $c^2$. Each of said end-pieces is provided with a flange $i$, adapted to have the open ends of the receiver body fastened thereon by means of a cord wound around the end of the sack on such flange. The bottom end-piece $c^2$ has no opening. The filter is preferably made of such length that the bottom thereof will be slightly above the inlet orifice or nipple h. The end-pieces c', c² are made of circular form, so as to provide for maintaining the sack-like body of the filter in expanded position; and it is also deemed expedient by me to provide some means for exerting a pulling strain on the bottom of the filter, so as to aid, in this wise, in keeping the hollow filter-body expanded. Such effect may be conveniently accomplished by weighting the bottom end-piece c², or by choosing material for making the same of sufficient weight.

I claim:

1. In a vacuum dust remover, the combination of a receiver, a dust filter within the receiver, said filter comprising a hollow body formed of fabric with the fibers thereof extending from the outer surface, a suction pipe communicating with the upper end of the dust filter, said pipe also forming a support for the dust receiver, an inlet pipe communicating with the receiver at a point below the dust filter, the suction of the air through the dust filter causing the latter to be vibrated to shake the accumulated dust from the fibers.

2. In a vacuum dust remover, the combination of a dust receiver provided with an inlet orifice, a dust filter within and spaced from the inner walls of the dust receiver, said filter comprising a hollow body of fabric provided with fibers extending outwardly therefrom into the space formed between the filter and receiver, a suction conduit extending through the wall of the dust receiver and into the dust filter the suction in the conduit drawing the dust from the inlet orifice toward and into contact with the extended fibers and as the latter is vibrated by the action of the air current the accumulated dust falls into the receptacle.

3. In a vacuum dust remover, the combination of a dust receiver provided with an inlet orifice, a dust filter suspended within the receiver, said filter comprising a hollow body of fabric having outwardly extended fibers, the filter being spaced from the walls of the receiver to provide a space entirely around said filter, a suction conduit extending into the filter, the inlet orifice being below the bottom of the filter whereby the suction of air in the conduit will draw the dust laden air in the space against the extended fibers and the vibration of the filter by the action of said air will shake the accumulated dust from the fibers.

4. In a vacuum dust remover, the combination of a receiver provided with an inlet orifice, a dust filter within and spaced from the walls of the receiver and consisting of upper and lower heads connected by a fabric body having outwardly extended fibers, means for suspending the filter in the receptacle to permit the lower head and body to vibrate under the influence of the air current and means for creating a suction from the inside of the filter to cause the dust ladened air to contact with the extended fibers, the inlet orifice being below the bottom of the filter.

5. In a vacuum dust remover, the combination of a receiver provided with an inlet orifice, a dust filter within the receiver and spaced from the walls thereof, said filter comprising a hollow body made of fabric having outwardly extended fibers, end heads having flanges over which the ends of the fabric body are secured, and a suction conduit extending through the wall of the receiver and the upper head of the filter to cause the dust ladened air to contact with the extended fibers.

6. In a vacuum dust remover, the combination with a receptacle having an inlet orifice a filter in the receptacle, said filter consisting of a body of fabric having fibers extending therefrom and a suction pipe arranged to communicate with the interior of the filter to draw the dust laden air from the inlet orifice into direct contact with the extended fibers.

JOHN G. MEYER.

Witnesses:
 WM. NELSON,
 CECIL LONG.